US010037720B2

(12) United States Patent
Brown et al.

(10) Patent No.: US 10,037,720 B2
(45) Date of Patent: Jul. 31, 2018

(54) NEON-FREE ILLUMINATED SIGNAGE

(71) Applicant: Technographix LLC, Fort Worth, TX (US)

(72) Inventors: Darrell Brown, Garland, TX (US); Delbert Billingsley, Itasca, TX (US); Kyle Hensley, Fort Worth Texas, TX (US)

(73) Assignee: Technographix, LLC, Fort Worth, TX (US)

( * ) Notice: Subject to any disclaimer, the term of this patent is extended or adjusted under 35 U.S.C. 154(b) by 0 days.

(21) Appl. No.: 15/480,210

(22) Filed: Apr. 5, 2017

(65) Prior Publication Data
US 2017/0294152 A1 Oct. 12, 2017

Related U.S. Application Data

(60) Provisional application No. 62/318,897, filed on Apr. 6, 2016.

(51) Int. Cl.
*G09F 13/18* (2006.01)
*F21V 8/00* (2006.01)

(52) U.S. Cl.
CPC .............. *G09F 13/18* (2013.01); *G02B 6/006* (2013.01); *G02B 6/0036* (2013.01); *G02B 6/0043* (2013.01); *G02B 6/0093* (2013.01); *G09F 2013/1895* (2013.01)

(58) Field of Classification Search
CPC ............... G09F 13/18; G09F 2013/185; G09F 2013/1895
See application file for complete search history.

(56) References Cited

U.S. PATENT DOCUMENTS

| 2002/0157292 | A1* | 10/2002 | Landers, Jr. | G02B 6/0065 40/546 |
| 2009/0100727 | A1* | 4/2009 | Chen | G09F 13/18 40/546 |
| 2012/0055055 | A1* | 3/2012 | Kunowski | G09F 13/04 40/544 |
| 2012/0075112 | A1* | 3/2012 | Sundholm | A62B 3/00 340/691.6 |
| 2014/0226361 | A1* | 8/2014 | Vasylyev | F21V 7/0091 362/606 |
| 2015/0371569 | A1* | 12/2015 | Cole | G09F 13/12 40/219 |

(Continued)

*Primary Examiner* — Gary C Hoge
(74) *Attorney, Agent, or Firm* — Hunton Andrews Kurth LLP

(57) ABSTRACT

A system and method for presenting a visual message by illumination. The system includes an LED light source and a transparent sheet. The transparent sheet is a transmission medium that includes a modified surface that refracts light in designated areas. The LED source illuminates the transparent sheet so that the LED illumination of the sheet achieves a visual effect of a neon filled glass tube lighting. The illumination system, however, is neon-free. The modified surface includes a disruption pattern or a printed ink layer, or the sheet includes two modified surfaces, one modified with a disruption pattern and another one modified with a printed ink layer. The LED light source includes multiple LED emitters on a circuit board. The LED light source projects light through the sheet in a direction that is parallel to a surface plane of the sheet.

14 Claims, 5 Drawing Sheets

(56) References Cited

U.S. PATENT DOCUMENTS

| | | | | |
|---|---|---|---|---|
| 2015/0371570 A1* | 12/2015 | Sciackitano | ............ | G09F 13/18 40/544 |
| 2017/0148363 A1* | 5/2017 | Frycz | ...................... | G09F 13/18 |
| 2017/0343720 A1* | 11/2017 | McCollum | ........... | G02B 6/0013 |

* cited by examiner

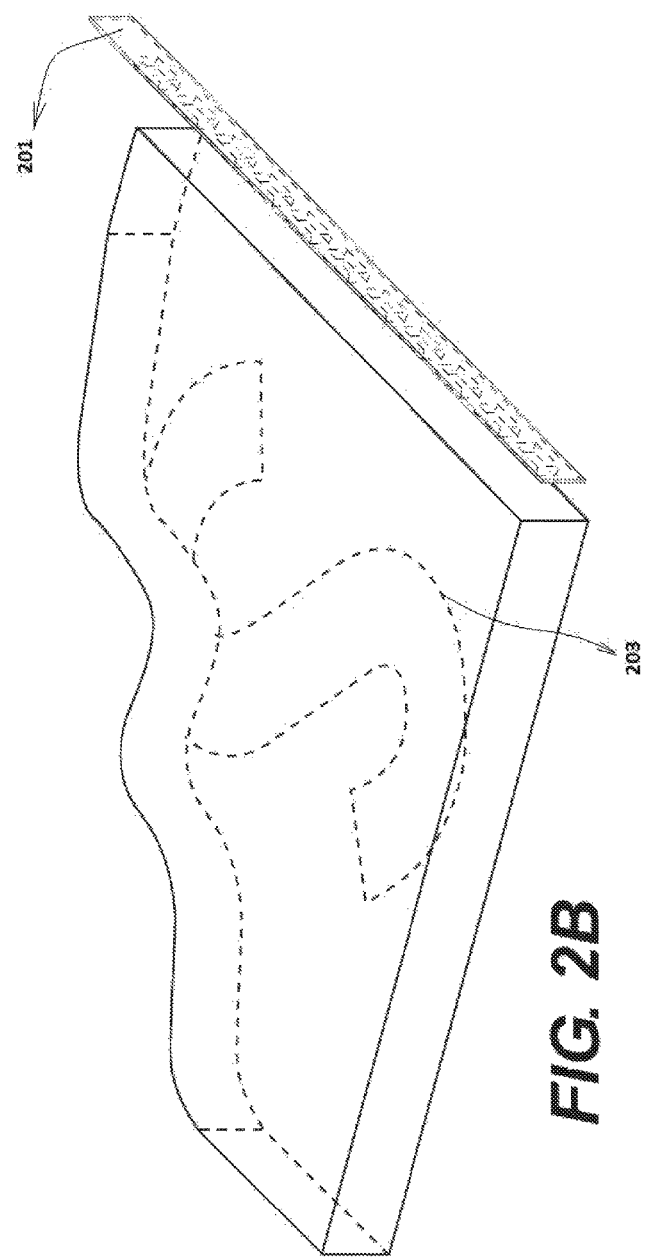

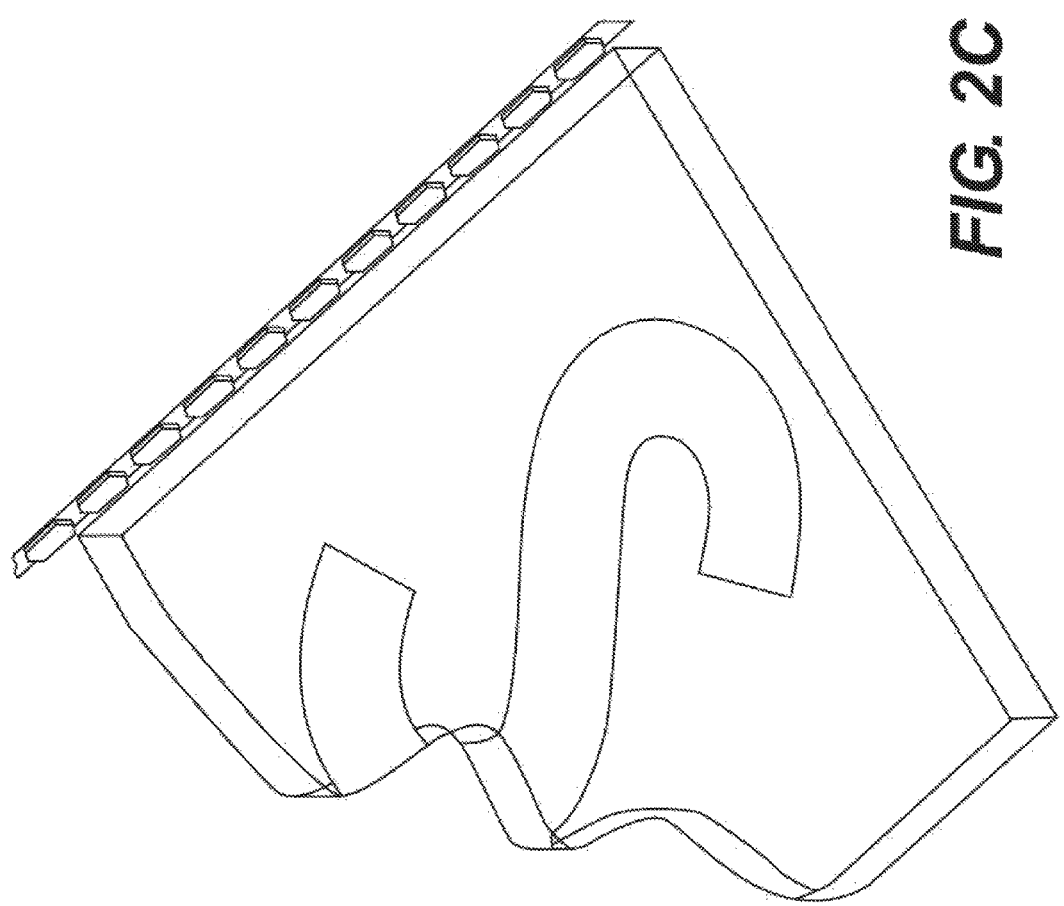

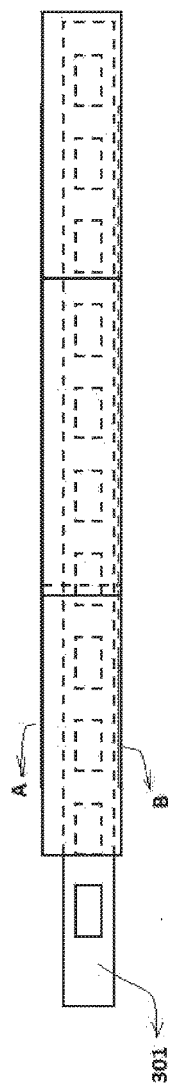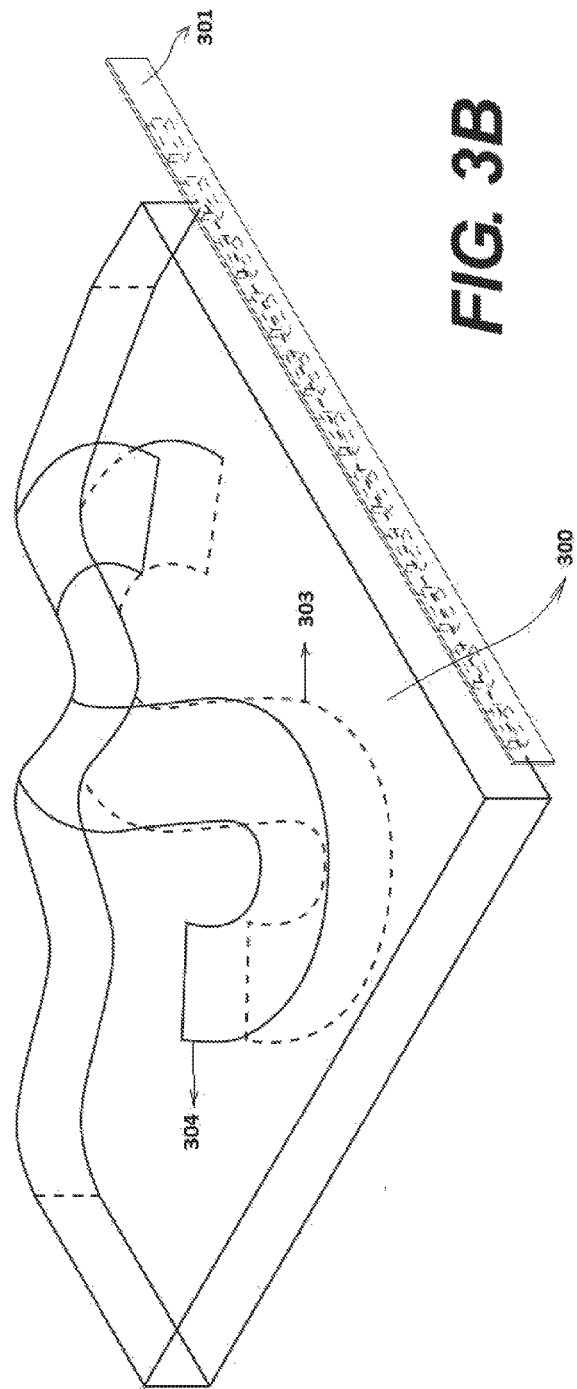

NEON-FREE ILLUMINATED SIGNAGE

This application claims priority to Provisional application Ser. No. 62/318,897, filed on Apr. 6, 2016.

TECHNICAL FIELD

The presently disclosed subject matter relates to presenting words, images and symbols for the purpose of visual communication. In particular, the presently disclosed subject matter relates to signage that uses illumination to show and emphasize a visual message.

BACKGROUND

In the signage industry, neon signs are electric signs lighted by long luminous gas-discharge tubes that contain rarefied neon or other gases. They are the most common use for neon lighting, which was first demonstrated in a modern form in December 1910 by Georges Claude at the Paris Motor Show. While they are used worldwide, neon signs were extremely popular in the United States from about 1920-1960. The installations in Times Square, many originally designed by Douglas Leigh, were famed, and there were nearly 2000 small shops producing neon signs by 1940. In addition to signage, neon lighting is now used frequently by artists and architects, and, in a modified form, in plasma display panels and televisions. The signage industry has declined in the past several decades.

Light-emitting tubes form colored lines with which a text can be written or a picture drawn, including various decorations, especially in advertising and commercial signage. By programming sequences of switching parts on and off, there are many possibilities for dynamic light patterns that form animated images.

In some applications, neon tubes are increasingly being replaced with LEDs, given the steady advance in LED luminosity and decreasing cost of high-intensity LEDs. However, proponents of neon technology maintain that they still have significant advantages over LEDs. For example, LED signs do not provide the attractive look of neon signage.

SUMMARY

The presently disclosed subject matter relates to a system for presenting a visual message by illumination. One example of the system comprises an LED light source and a transparent sheet. The transparent sheet may be a transmission medium that includes at least one modified surface that refracts light in designated areas. The LED source may illuminate the transparent sheet so that the LED illumination of the sheet achieves a visual effect of a neon filled glass tube lighting. The system for presenting the visual message by illumination may be neon-free. The at least one modified surface may include a disruption pattern or a printed ink layer. The sheet may include two modified surfaces, one modified with a disruption pattern and another one modified with a printed ink layer. The LED light source may include multiple LED emitters on a circuit board. The LED light source may project light through the sheet in a direction that is parallel to a surface plane of the sheet.

Another embodiment is a method of presenting a visual message by illumination, comprising: modifying at least one surface of a transparent sheet so that the at least one surface refracts light in designated areas, and illuminating the transparent sheet by an LED light source so that the illumination of the sheet achieves a visual effect of a neon filled glass tube lighting.

BRIEF DESCRIPTION OF THE DRAWINGS

FIG. 2A shows an example of a clear sheet with a light source abutting the perimeter of the sheet.

FIG. 2B shows an example of a clear sheet with a surface disruption pattern and a light source abutting the perimeter of the sheet.

FIG. 2C shows an example of an illuminated clear sheet with a surface disruption pattern.

FIG. 3A shows an example of a clear sheet with two affected surfaces and a light source abutting the perimeter of the sheet.

FIG. 3B shows an example of a clear sheet with a surface disruption pattern and a printed ink, and a light source abutting the perimeter of the sheet.

DETAILED DESCRIPTION

The presently disclosed subject matter provides a technique that incorporates illumination advantages of LED technology while achieving visual appeal of the traditional neon lights. Embodiments that improve neon-free signage and that overcome the defects of other LED signage are provided, which at the same time achieve many of the advantages of neon signage. Embodiments attain improved neon-free signage that utilizes LEDs as a light source and transparent sheets as a light transmission medium. The sheets can be made of acrylic or poly carbonate or any other material deemed suitable.

With LEDs as a light source and transparent sheets as the light transmission medium, embodiments utilize surface disruption patterns on the sheets to refract light in designated areas and printed inks to affect the color of light emitted to achieve emulation of neon filled glass tube lighting in any design standard. As a result, the improved neon-free signage may include the emulation of neon tube lighting and a clear/transparent background area surrounding the emulation of neon tubes.

Figure 1A:
FIG. 1A shows an example of a clear sheet.
Figure 1B:
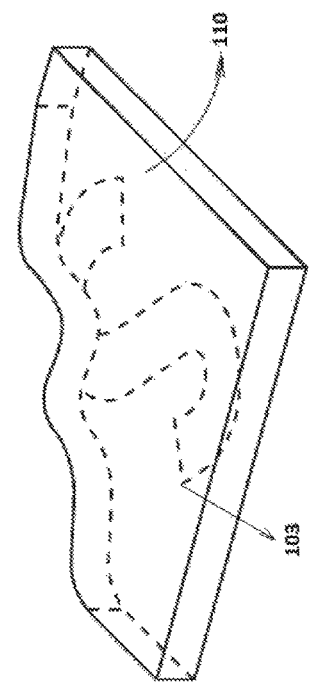
FIG. 1B shows an example of a clear sheet with a surface disruption pattern.
Figure 1C:
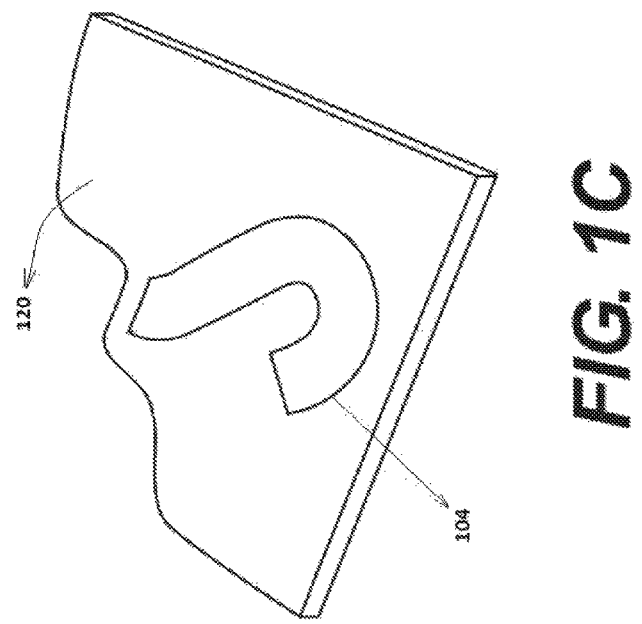
FIG. 1C shows an example of a clear sheet with a printed ink.

With reference now to FIGS. 1A-1C, embodiments may be implemented with a plurality of clear sheets, such as acrylic sheets. For example, a surface disruption pattern 103 may be on a first sheet 110, as shown in the view of FIG. 1B. A printed ink 104 may be used for creating an image on a second acrylic sheet 120, as illustrated in FIG. 1C. The printed ink 104 may be printed on either a bottom or top surface of the second sheet 120. In this manner, the second sheet 120 includes a protective, transparent sheet abutting the printed ink layer 104.

As shown in FIGS. 2A-2C, the surface disruption pattern may be etched on either a bottom or top surface of the clear sheet 210. Thus, the clear sheet 210 may include a protective, transparent sheet abutting surface disruption pattern 203. The surface disruption pattern 203 may be formed using known techniques. For example, the surface disruption 203 may be formed by, e.g., laser etching, mechanical router etching, printing clear ink with refractive pigments or by any other surface disruption techniques considered appropriate.

FIGS. 2A-2C show light source 201, such as, for example a LED strip to edge light the panel. The invention is not limited to using a particular light source, however. The etched surface disruption 203 may be added to focus illumination. The LED light source 201 may include multiple LED emitters on a circuit board. Moreover, the source 201 may be placed perpendicular to the surface and abutting the perimeter of the sheet 210 or in a recessed channel cut into the sheet 210. The LED light source 201 may project light through the sheet 210 in a direction that is parallel to the surface plane of the sheet 210. The sheets discussed with regards to this embodiment may be married to complete the emulation of neon filled glass tube lighting.

With reference to FIG. 3A-3C, one acrylic sheet 300 may be used to provide the printed ink layer 304 and the surface disruption pattern 303. In such an embodiment, the surface disruption pattern 303 is on side "B" of the acrylic sheet (the bottom surface) and the printing ink 304 on side "A" of the acrylic sheet (the top surface). Shown in FIGS. 3A-3B is the LED light source 301. As with the embodiment discussed above, the LED light source 301, which may include multiple LED emitters on a circuit board, may be placed perpendicular to the surface and abutting the perimeter of the clear sheet 300 or in a recessed channel cut into the clear sheet 300. The LED light source 301 may project light through the clear sheet 300 in a direction that is parallel to the surface plane of the clear sheet 300.

In one example, a protective layer may be added to one or both sides of the clear sheet 300 thereby sandwiching it to protect from inadvertent, unintentional, or accidental etching. The protective layer, thus, prevents damage to the desired disruption pattern 303 or printed ink layer 304. The protective layer may be made of a clear, transparent, scratch resistant material, such as a hard plastic, for example.

Figure 4:
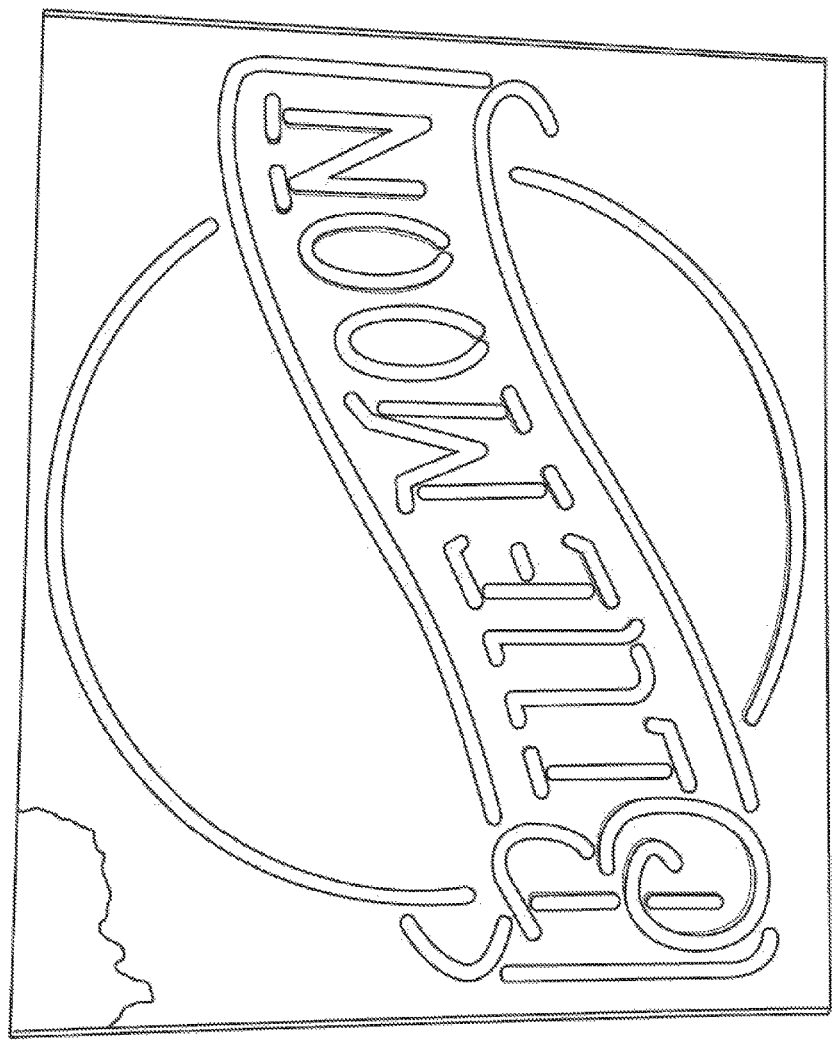
FIG. 4 shows an example implementation of the neon-free signage.

With reference now to FIG. 4, shown is an example implementation of the improved neon-free signage, showing an advertisement symbol.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

Although the various systems, functions, or components of the present invention may be described separately, in implementation, they do not necessarily exist as separate elements. The various functions and capabilities disclosed herein may be performed by separate units or be combined into a single unit. Further, the division of work between the functional units can vary. Furthermore, the functional distinctions that are described herein may be integrated in various ways.

The foregoing description and examples have been set forth merely to illustrate the invention and are not intended to be limiting. Each of the disclosed aspects and embodiments of the present invention may be considered individually or in combination with other aspects, embodiments, and variations of the invention. Modifications of the disclosed embodiments incorporating the spirit and substance of the invention may occur to persons skilled in the art and such modifications are within the scope of the present invention.

What is claimed is:

1. A system for presenting a visual message by illumination, comprising an LED light source and a transparent sheet, wherein the transparent sheet is a transmission medium that includes two modified surfaces, so that at least one modified surface refracts light in designated areas, wherein the LED source illuminates the transparent sheet, and wherein the two modified surfaces include one modified with a disruption pattern and another one modified with a printed ink layer.

2. The system of claim 1, wherein the system for presenting the visual message by illumination is neon-free.

3. The system of claim 1, wherein the at least one modified surface includes a disruption pattern.

4. The system of claim 1, wherein the at least one modified surface includes a printed ink layer.

5. The system of claim 1, wherein the LED light source includes multiple LED emitters on a circuit board.

6. The system of claim 1, wherein the LED light source projects light through the sheet in a direction that is parallel to a surface plane of the sheet.

7. The system of claim 1, wherein a protective layer is added to both sides of the transparent sheet.

8. The system of claim 7, wherein the protective layer is made of transparent hard plastic with at least one side modified with a printed ink layer.

9. A method of presenting a visual message by illumination, comprising: modifying two surfaces of a transparent sheet so that the at least one surface refracts light in designated areas, and illuminating the transparent sheet by an LED light source, wherein the two modified surfaces include one modified with a disruption pattern and another one modified with a printed ink layer.

10. The method of claim 9, wherein the transparent sheet is neon-free.

11. The method of claim 9, wherein the at least one modified surface includes a disruption pattern.

12. The method of claim 9, wherein the at least one modified surface includes a printed ink layer.

13. The method of claim 9, wherein the LED light source includes multiple LED emitters on a circuit board.

14. The method of claim 9, wherein the LED light source projects light through the sheet in a direction that is parallel to a surface plane of the sheet.

* * * * *